United States Patent
Kan et al.

(10) Patent No.: US 8,180,034 B2
(45) Date of Patent: May 15, 2012

(54) APPARATUS, AND ASSOCIATED METHOD, FOR A CTI-ENABLED SIP-PHONE

(75) Inventors: Chao Kan, Frisco, TX (US); Michael S. Wengrovitz, Concord, MA (US)

(73) Assignee: Alcatel Lucent, Paris (FR)

(*) Notice: Subject to any disclaimer, the term of this patent is extended or adjusted under 35 U.S.C. 154(b) by 1264 days.

(21) Appl. No.: 11/020,373

(22) Filed: Dec. 22, 2004

(65) Prior Publication Data

US 2006/0133349 A1    Jun. 22, 2006

Related U.S. Application Data

(63) Continuation-in-part of application No. 09/966,155, filed on Sep. 28, 2001, now Pat. No. 6,909,778.

(60) Provisional application No. 60/308,373, filed on Jul. 27, 2001.

(51) Int. Cl.
*H04M 3/42* (2006.01)

(52) U.S. Cl. ......... 379/201.01; 379/142.15; 379/265.02; 379/900; 370/352; 370/271; 370/466

(58) Field of Classification Search ........... 370/352, 370/270, 271, 401, 466; 379/265.02, 265.09, 379/258, 201.01, 142.15
See application file for complete search history.

(56) References Cited

U.S. PATENT DOCUMENTS

| | | | | |
|---|---|---|---|---|
| 2002/0009077 | A1* | 1/2002 | Bardehle | 370/389 |
| 2002/0118675 | A1* | 8/2002 | Strathmeyer et al. | 370/352 |
| 2003/0021404 | A1* | 1/2003 | Wengrovitz | 379/219 |
| 2004/0008837 | A1* | 1/2004 | Sylvain | 379/265.09 |
| 2004/0208134 | A1* | 10/2004 | Neyman et al. | 370/259 |
| 2004/0249955 | A1* | 12/2004 | Wuerful | 709/227 |
| 2005/0069102 | A1* | 3/2005 | Chang | 379/88.18 |
| 2005/0174987 | A1* | 8/2005 | Raghav et al. | 370/351 |

FOREIGN PATENT DOCUMENTS

| | | |
|---|---|---|
| EP | 1089529 A2 | 4/2001 |
| EP | 1124361 A2 | 8/2001 |
| WO | WO 03/077522 A1 | 9/2003 |

OTHER PUBLICATIONS

Oliver, et al.; Notes on CSTA in IP Telecommunications; ECMA Standardizing Information and Communication Systems; Sep. 21, 1999; pp. 1-39.

Using CSTA for SIP Phone User Agents (uaCSTA); ETSI TR 102 348; ETSI Standards; European Telecommunications Standards Institute; Sep. 2004; pp. 1-75; vol. ECMATC32, No. V1.1.1.; Sophia-Antipo, FR.

* cited by examiner

*Primary Examiner* — Antim Shah
(74) *Attorney, Agent, or Firm* — Garlick & Markison

(57) ABSTRACT

A CTI-enabled SIP-Phone, and an associated method, is provided for a telephonic call center. Responsive to a call operation indication, such as delivery to the phone of a SIP invite message, or of a CTI-formatted call instruction, the embedded functionality of the SIP-Phone provides interfacing operations, such as CTI-to-SIP or SIP-to-CTI conversions, to facilitate communications of the phone at the call center.

13 Claims, 4 Drawing Sheets

APPARATUS, AND ASSOCIATED METHOD, FOR A CTI-ENABLED SIP-PHONE

CROSS REFERENCE TO RELATED APPLICATIONS

This application claims priority as a continuation-in-part application under 35 U.S.C. §120 to U.S. application Ser. No. 09/966,155 filed Sep. 28, 2001, entitled "Enhanced IP Pone Operation," to Michael Wengrovitz, now U.S. Pat. No. 6,909,778 issued Jun. 21, 2005, which claims the benefit under 35 U.S.C. 119(e) to U.S. provisional application No. 60/308,373 filed on Jul. 27, 2001.

The present invention relates generally to a CTI-enabled (Computer Telephony Integration-enabled) SIP-phone (Session Initiation Protocol-Phone) used within a CTI-enabled call center. More particularly, the present invention relates to an apparatus and associated method for a SIP-phone that includes embedding CTI sourcing functions within the phone.

A PBX (private branch exchange) with the CTI sourcing functionality is not required as the CTI sourcing functionality is embedded within the SIP-phone. SIP-to-CTI and CTI-to-SIP conversions are performed at the SIP-phone all the while using conventional information interfaces, conventionally used at conventional CTI-enabled call centers. Call center personnel are able to view, use, and operate familiar information interfaces while the CTI-sourcing functionality embedded at a SIP-phone provide for the functionalities that previously required functionalities maintained at a call-center PBX.

BACKGROUND OF THE INVENTION

Public-access telephonic networks, through which the telephonic communications are conducted are widely deployed. Many users communicate telephonically both for business and non-business purposes and interconnection of different telephonic networks, deployed over different geographical areas, permit users to communicate over widely disparate areas.

A user communicates by way of a telephonic network through use of a telephonic station, or set. Some conventional telephonic stations are connectable to a telephonic network by way of wireline or wireless connections.

Telephonic networks of conventional construction utilize circuit-switched communication techniques. When a circuit-switched connection is formed, a circuit-switched channel, a dedicated channel, is dedicated to the communication session between the telephonic stations for the duration of the communication session during which the communication service is effectuated. By providing the dedicated, circuit-switched connection between the telephonic stations, the connection is maintained between the telephonic stations during the communication session, irrespective of the amount of data that is communicated between the telephonic stations. Data might, for instance, be only intermittently communicated during the communication session. During times in which data is not communicated between the telephonic stations, the communication capacity dedicated to the communication session by way of the circuit-switched connection is not fully utilized. And, as a result, the communication capacity of a telephonic communication system that utilizes circuit-switched connections is usually inefficiently utilized.

Telephonic networks are increasingly constructed in manners that permit communications between telephonic stations upon shared channels using shared-channel communication techniques. By providing for communications using shared channels rather than dedicated channels, the communication capacity of the communication system is able to be utilized more efficiently.

Packet-based communication schemes, for instance, utilize packet-switched connections permitting shared channels to be used upon which to communicate data. Packet-formatted data is formed of discrete packets, the communication of which is permitted at discrete intervals. The same channel that is used to communicate data packets pursuant to a first communication session to effectuate a first communication service between a first set of telephonic stations is used also to communicate data packets in a second communication session, essentially concurrent with the first communication session, but between a second set of telephonic stations. A multiple increase in the communication capacity of the communication system, relative a corresponding circuit-switched communication system, is possible.

Packet-formatting of the data is generally performed according to a standardized protocol. Various packet formatting protocols have been promulgated, some at different logical layers, and telephonic communication networks have been constructed to be operable to communicate data formatted according to such standard formatting protocols. Packet data networks include, for instance, the internet backbone networks permitting of general public access. Telephonic stations that are connectable to the internet backbone are commercially available and their usage has become increasingly popular. Communication costs associated with their use is generally less than, and sometimes substantially less than, the costs associated with telephonic communications by way of a conventional, circuit-switched communication system. So-called, SIP-phones are exemplary of these telephonic stations. SIP-phones utilize a session initiation protocol (SIP). More generally, telephonic stations connectable to packet networks are referred to as packet-based phones. SIP-phones are peer-to-peer devices in that they are capable of direct communications by way of an appropriate communication fabric without requiring the communication fabric to provide functionality, other than, e.g., for the communication connection and routing of communication data.

SIP-Phones and other packet-based phones are increasingly utilized in commercial applications, such as telephonic call centers in which call center agents utilize SIP-Phones pursuant to call center operations. Many conventional call centers have used conventional telephonic stations that are connected, by way of a PBX (Private Branch Exchange), with a public switched telephonic network. Typically, the call center PBX is also connected to a computer telephony integration device, such as a CTI server to which a personal computer is positioned in communication connectivity. The computer telephony integration device provides CTI information to users of the telephonic stations at the call center.

The CTI information is typically provided to a user by way of a display screen of the personal computer, or the like, positioned at, or near, the work area of the user. CTI-sourcing functionality is conventionally embedded at a PBX and is used in conjunction with the CTI server to cause information to be used pursuant to call center operations to be displayed. That is to say, conventionally, call centers utilize screen-pop, click-to-dial, and customer relationship management (CRM) applications in order to achieve increased agent productivity, enhanced customer service, and reduced cost. This functionality is typically achieved by coupling a CTI link from the PBX of the call center, through a CTI server, to CTI client applications residing on the personal computer used at the work area of the user.

An existing ECMA (European Computer Manufacturers Association) technical report describes a manner by which to use CSTA (Computer Supported Telecommunications Applications) over a SIP session to control and observe a SIP user agent (uaCSTA). That is, a personal computer-based application can use uaCSTA directly to control and observe its associated SIP user agent phone. However, this existing manner focuses on the control of SIP phones instead of CTI sourcing functions that are more typically carried out by a PBX, which includes, e.g., routing mechanisms in addition to control functions. And, this existing manner needs the CTI application software to be revised to carry the CSTA information.

IP (Internet Protocol) PBXs are also available and also provide PBX functionality to SIP-enabled, or other packet-based, phones, such as those used at call centers. An IP PBX is also typically connected, in a call center application, to a computer telephony integration device.

When SIP-Phones are utilized rather than conventional, circuit-switched telephonic stations, a PBX may be not mandatory in the future because SIP is a peer-to-peer protocol. However, because the CTI information is currently provided through use of CTI sourcing functionally of the PBX, conventional schemes do not provide a manner otherwise conveniently to provide an agent at the call center with the CTI information.

A mechanism that would provide CTI functionality to a user of a SIP-phone at a call center without need to resort to a PBX at which the CTI-sourcing functionality is conventionally resident would therefore be advantageous. Call center agents are also generally familiar with existing CTI information interfaces, and it would be further advantageous for such mechanisms to utilize the existing CTI information interfaces, obviating the need for the call center agents to become accustomed to new interfaces.

It is in light of this background information related to packet-based telephonic stations that the significant improvements of the present invention have evolved.

SUMMARY OF THE INVENTION

The present invention, accordingly, advantageously provides apparatus, and an associated method, for a CTI-enabled (Computer Telephony Integration-enabled) SIP-Phone (Session Initiation Protocol-Phone).

Through operation of an embodiment of the present invention, a manner is provided for a SIP-phone that includes embedding CTI sourcing functions within the SIP-phone itself. Computer telephony integration sourcing functionalities, embedded at the SIP-phone is used to source CTI information. The need for a PBX to source such functionality is obviated. And, a SIP-based phone located, e.g., at a call center, and directly connected to a packet data network, is able to obtain and to make use of CTI-sourced information. SIP-to-CTI and CTI-SIP conversions are performable at the SIP-phone. A PBX, no longer necessary to interconnect the telephonic station with a PSTN also no longer is needed to provide the CTI-sourcing functions.

CTI information sourcing functions are embedded within the SIP, or other packet-based, phones. The same functionalities are provided by the phone-embedded CTI information sourcing functions as those conventionally provided by a PBX.

In one aspect of the present invention, a PBX (private branch exchange) at which the CTI sourcing functionality is typically maintained in conventional call centers is not required as the CTI sourcing functionality is embedded at the SIP phone. SIP-to-CTI and CTI-to-SIP conversions are performed at the SIP-phone all the while using conventional information interfaces, conventionally used at conventional CTI-enabled call centers. Call center personnel are able to view, use, and operate familiar information interfaces while the CTI-sourcing functionality embedded at a SIP-phone provide for the functionalities that previously required continued use of a call center PBX.

When a call request is to be terminated at the SIP phone, an SIP invite message is routed through the packet data network and delivered to the SIP phone. Responsive to the detection at the SIP phone of the SIP invite message, the functionality embedded at the SIP phone causes the invite message to be converted to CTI format. And, once converted into the CTI format, the SIP phone generates a CTI alerting message that is provided to the CTI server. Then the CTI server will convert this CTI alerting message into another CTI format, which may be proprietary to various CTI applications, resident on end personal computers. And, responsive to the alerting message, the CTI application operates to return information to the SIP phone user. For instance, the information returned and made available to a user of the SIP phone comprises screen display information that is displayed at a screen display prior to the acceptance of the invitation. The display information includes, for instance, information that identifies the calling party that originates the SIP invite message. Responsive to viewing of the display information, the user of the SIP phone selects whether to accept the invitation. If the invitation is accepted, a SIP OK message is generated for return to the calling party.

In another aspect of the present invention, a call is originated at the SIP phone for termination at a remote station. The telephonic identifier that identifies the remote station is accessed at the CTI server through operation of an appropriate CTI application. And the number, once retrieved, is provided to the SIP phone. At the SIP phone, a CTI-to-SIP conversion is performed to convert the telephonic identifier and other information into SIP form. And, thereafter, the SIP form generates a SIP invite message that is communicated to the remote station. If the remote station accepts the invitation, call connections are performed and the communication session between the SIP phone and the remote station commences.

In another aspect of the present invention, routing functionality is provided when multiple SIP phones are concurrently connected to permit their concurrent operation by a user to communicate telephonically while also obtaining CTI information. A CTI-SIP phone server is provided that is connectable to each of the SIP phones. And, the CTI-SIP phone server is coupled to a CTI server, or other device, at which the CTI applications are maintained. A single IP (Internet Protocol) connection is maintained between the CTI-SIP phone server and the CTI server. And, the phone server maintains a plurality of IP connections with the plurality of SIP phones. The phone server provides the routing functionality to provide information obtained form the CTI applications maintained at the CTI server for delivery to the individual SIP phones.

By embedding the CTI information sourcing functionality in the SIP phone, a PBX, no longer needed to interconnect the phone to a PSTN, is also no longer needed to provide the CTI information sourcing functions. A call center is able, thereby, to be constructed wholly free of use of a PBX without changing or altering the existing CTI applications used by call center agents.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
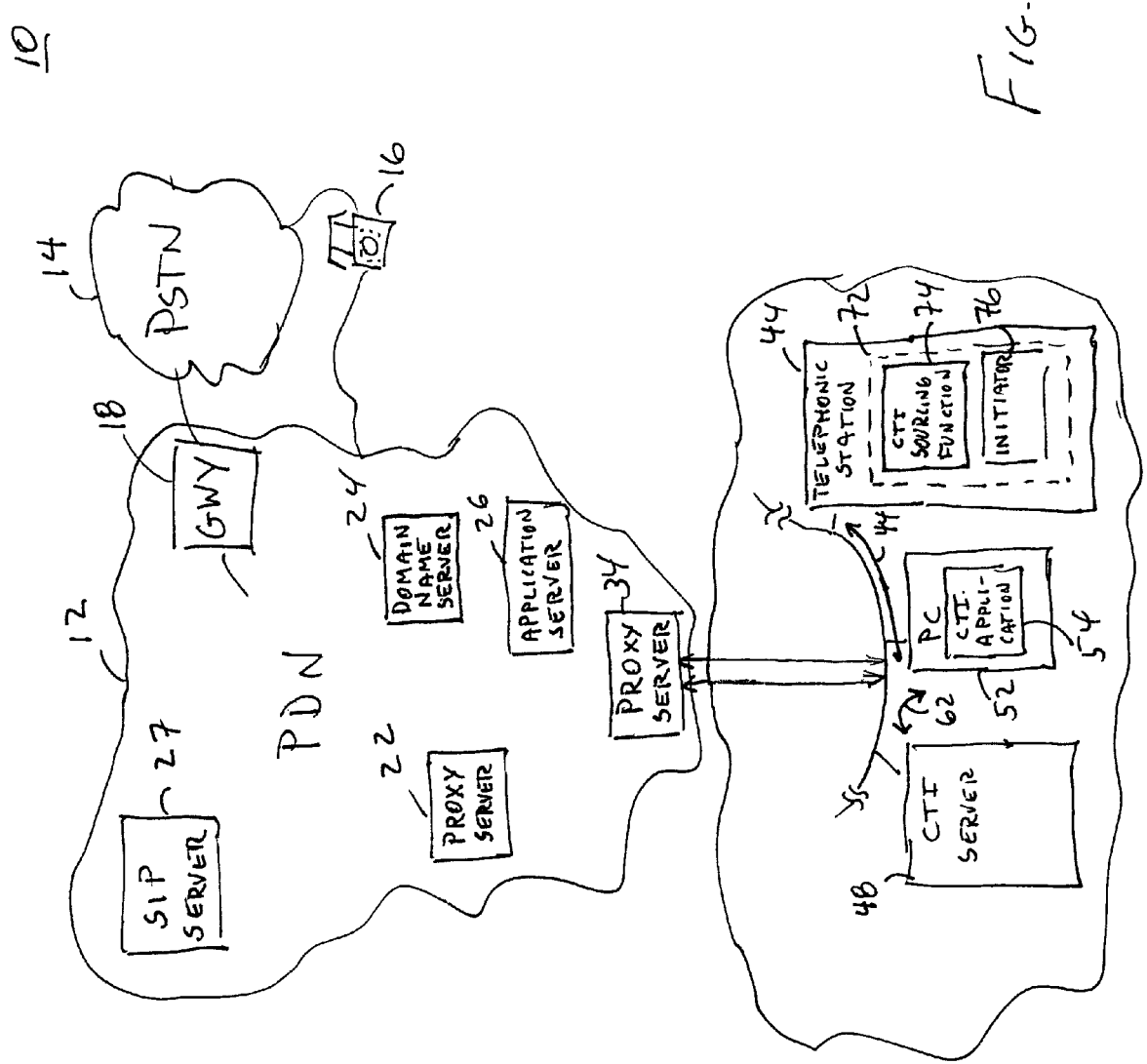
FIG. 1 illustrates a functional block diagram of an exemplary telephonic communication network in which an embodiment of the present invention is operable.

Referring first to FIG. 1, a communication network, shown generally at 10, provides for packet data network 12 and, here, also a time division multiplexed (TDM) network represented by a public switched telephonic network (PSTN) 14. Telephonic stations are connectable to the networks 12 and 14. The telephonic station 16 is representative of a telephonic station connectable to either the network 12 or the network 14. A telephonic station constructed to be operable when connected to the PSTN 14 is operable generally pursuant to circuit-switched connections. And, a telephonic station 16 constructed to be operable when connected to the packet data network 12 is generally operable pursuant to packet-switched connections, i.e., connections which permit the use of a shared, rather than a dedicated, channel. The packet data network and the PSTN are interconnected by way of a media, or other appropriate, gateway 18, that, here, is functionally represented as part of the packet data network. The gateway provides for routing, and other, functions that permit telephonic communications between telephonic stations connected to the different types of networks.

The packet data network includes various conventional functional entities, here including a proxy server 22, a domain name server 24, an application server 26, and a SIP server 27. Other functional entities used pursuant to conventional operation of the packet data network can analogously be shown.

The communication network 10 further includes an enterprise network 28 that also forms a packet data network. The enterprise network is installed, for instance, to encompass a particular enterprise, such as a business, or the like. The enterprise network is connected to the PDN 12 by way of a proxy server 34 that is embodied at the packet data network. Telephonic stations, such as the telephonic station 44, are connected in communication connectivity at the enterprise network.

In the exemplary representation of the figure, the enterprise network is installed at a telephonic call center. As is conventional of call centers, computer telephony integration (CTI) functionality is provided to enterprise agents, i.e., operators or users of the telephonic stations, such as the telephonic station 44, to facilitate call operations at the call center. Customer relationship management (CRM) functions are amongst the functionalities available to a telephonic agent, or other user, of a telephonic station 44.

A CTI server 48 and a personal computer (PC) 52 at which CTI applications 54 are embodied, are also located at the call center. Communication paths, represented by the arrow 58 are formed between the telephonic station 44 and the CTI server 48, communication paths are formed between the server 48 and the PC 52, here represented by the segment 62, also by way of the enterprise network.

The CTI applications 54 are telephony or call center applications that run on the PC 52. The applications comprise displays that form, e.g., a 'front window,' such as an emulated telephone pad or other user interface. A 'background' part of the application generates an associated CTI message that is sent, e.g., to the CTI server 48. The CTI message, at times designated herein as an APP-CTI is formatted pursuant to a proprietary protocol format, depending upon the particular application. When such a message is delivered to the CTI server, the server converts the message into a format recognizable by various PBXs, and this format is, at times, designated herein as 'PBX-CTI.'

The telephonic station 44 is a packet-based phone, here an SIP (Session Initiation Protocol) phone. The SIP-phone is operable generally in conformity with the session initiation protocol.

While, conventionally, a call center utilizes a private branch exchange (PBX), the call center forming part of the communication network 10 is digitally-implemented, using peer-to-peer communication devices, here SIP-phones.

Conventionally, however, when a PBX is utilized, the private PBX also includes CTI sourcing functionality that performs any of various sourcing functions. In other words, conventionally, the private branch exchange provides not only interconnections with a PSTN but also the CTI-sourcing functions. Since SIP is capable of peer-to-peer communications, a packet-based SIP, or other, phone, may be connectable to a packet-based network without being interfaced by way of the PBX to an external communication network. The PBX may no longer be needed for interconnection purposes of the phone to the network. But, its additional functionality to provide the telephonic agents, or other users, of telephonic stations with the CTI-sourcing functionality requires its continued use.

To obviate the otherwise continued need for a PBX, the telephonic station 44 includes apparatus 72 of an embodiment of the present invention. The apparatus 72 includes CTI-sourcing sourcing functionality 74 for sourcing CTI functions pursuant to call center operations. The functionality 74 of the apparatus 72 is embedded at the telephonic station and operates to provide any various CTI sourcing functions, such as conversion functions. As the functionality is embedded at the telephonic station, i.e., the SIP phone, the need to utilize a PBX is wholly obviated. Accordingly, and as shown in the communication network 10, the call center encompassed by the enterprise network 32 is free of a PBX. The SIP, or other packet-based, phone forms a source of a PBX-CTI protocol, previously provided by a conventional PBX.

Here, the apparatus 72 further includes an initiator 76. An indication, here represented to be provided to the initiator by way of the line 78, causes operation of the initiator to initiate operation of the sourcing functionality. The indication is received, variously, locally from the call center and from a location external to the enterprise network.

A call to be terminated at the telephonic station is commenced with signaling overhead that is delivered from the originating station, such as the telephonic station 16. And, an overhead signaling message forms the indication that initiates operation of the initiator 76. And, signaling initiated via a CTI application and provided to the telephonic station when a call is originated from CTI application also, alternately, forms the indication provided to the initiator 76 to initiate operation of the functionality of the apparatus. Information retrieved from the CTI application is used to facilitate call center operations by the telephonic agent that operates the telephonic station. As the functionality of the sourcing function is embedded at the telephonic station, a PBX is not required to perform such functions.

Figure 2:
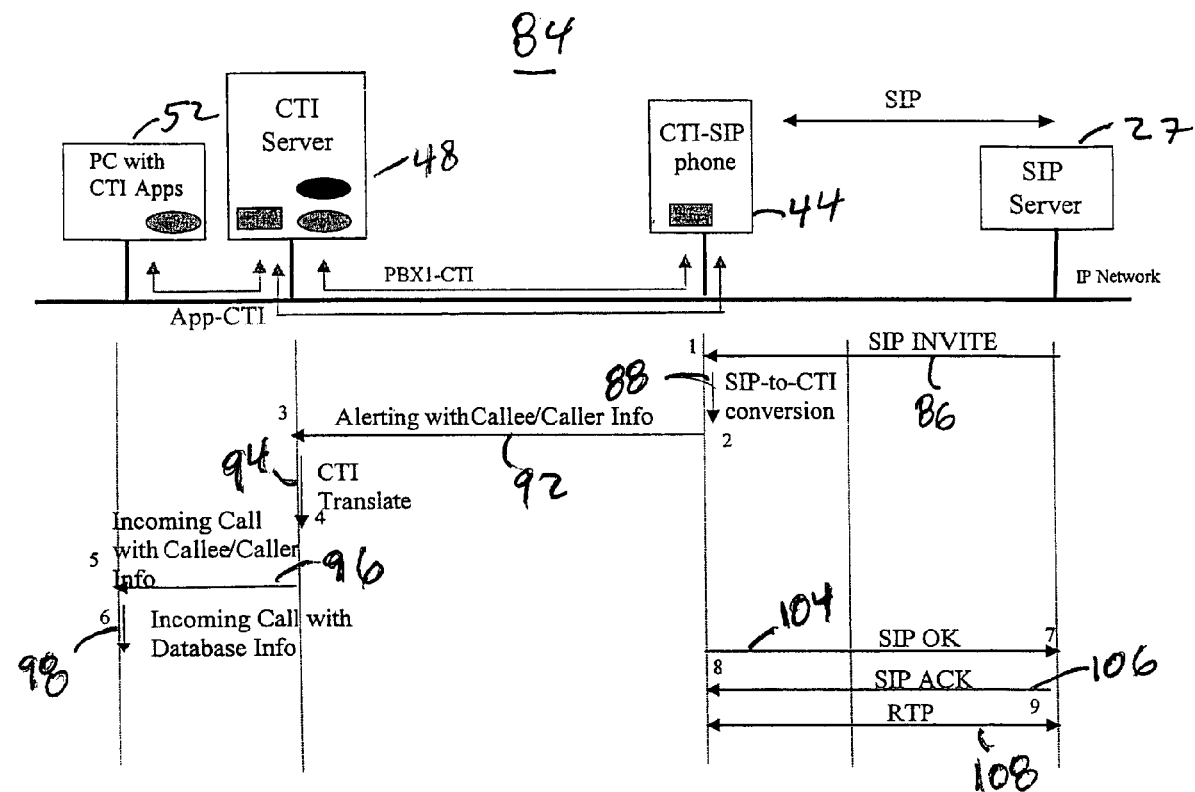
FIG. 2 illustrates a message sequence diagram representative of exemplary incoming call signaling generated during operation of the telephonic communication network shown in FIG. 1 pursuant to operation of an embodiment of the present invention.

Turning next to FIG. 2, a message sequence diagram, shown generally at 84, represents exemplary incoming call signaling generated during operation of the communication network 10 shown in FIG. 1. Messages generated and communicated between the SIP server 27, the telephonic station 44, and the element 46, formed of the CTI server 48 and the personal computer 52 having the CTI applications 54.

When a call is initiated remotely, such as by a telephonic station 16 (shown in FIG. 1), indications of the call initiation are routed to the SIP server 27. The manner by which the call initiation is routed is dependent upon the type of, and location of, the telephonic station from which the call is initiated. Responsive to detection at the SIP server of the delivery of the indication of the call initiation, the SIP server generates a SIP invite message, indicated by the segment 86. The SIP invite message is routed through the packet data network and delivered to the telephonic station 44. Once delivered to the telephonic station, the apparatus of an embodiment of the present invention, embedded at the telephonic station, converts the SIP message into a CTI (Computer Telephonic Integration) message. The SIP invite message here forms the indication that causes the initiator 76 (shown in FIG. 1) to initiate operation of the computer telephony integration element to operate. Here, operation performs interfacing by causing the conversion of the SIP message to the CTI message, such conversion indicated in the diagram by the segment 88.

Once the conversion into the CTI format has been made, the apparatus embedded at the telephonic station causes an alert message, indicated by the segment 92, to be CTI server 48. The alert message contains call-related information, e.g., caller and callee information. Once delivered to the CTI server, the CTI server operates, conventionally, to perform CTI translation operations, indicated by the segment 94, then to invoke a selected CTI application by providing the personal computer at which the selected application is maintained with an indication of the incoming call with the callee/caller information, or other appropriate information, indicated by the segment 96. Responsive thereto, and as indicated by the segment 98, the application that is invoked retrieves data base information associated with the incoming call. The data base information includes, for instance, identification information associated with the calling party. The retrieved data base information is displayed in a manner permitting the telephonic agent, or other user, of the telephonic station 44 to review the displayed information. In one implementation, the retrieved information is provided to a PC display screen in viewing proximity of the telephonic agent.

And, the user of the telephonic station 44 accepts the SIP invitation, causing the telephonic station to generate an SIP OK message 104. The acceptance of the invitation is, e.g., dependent upon the information displayed and viewed by the user of the telephonic station. And, as indicated by the segment 106, an SIP acknowledge (SIP ACK) message is returned to the telephonic station. Then, and as indicated by the block 108, the RTP (Real Time Protocol) communications are carried out to effectuate the telephonic communication with the telephonic station 44.

Figure 3:
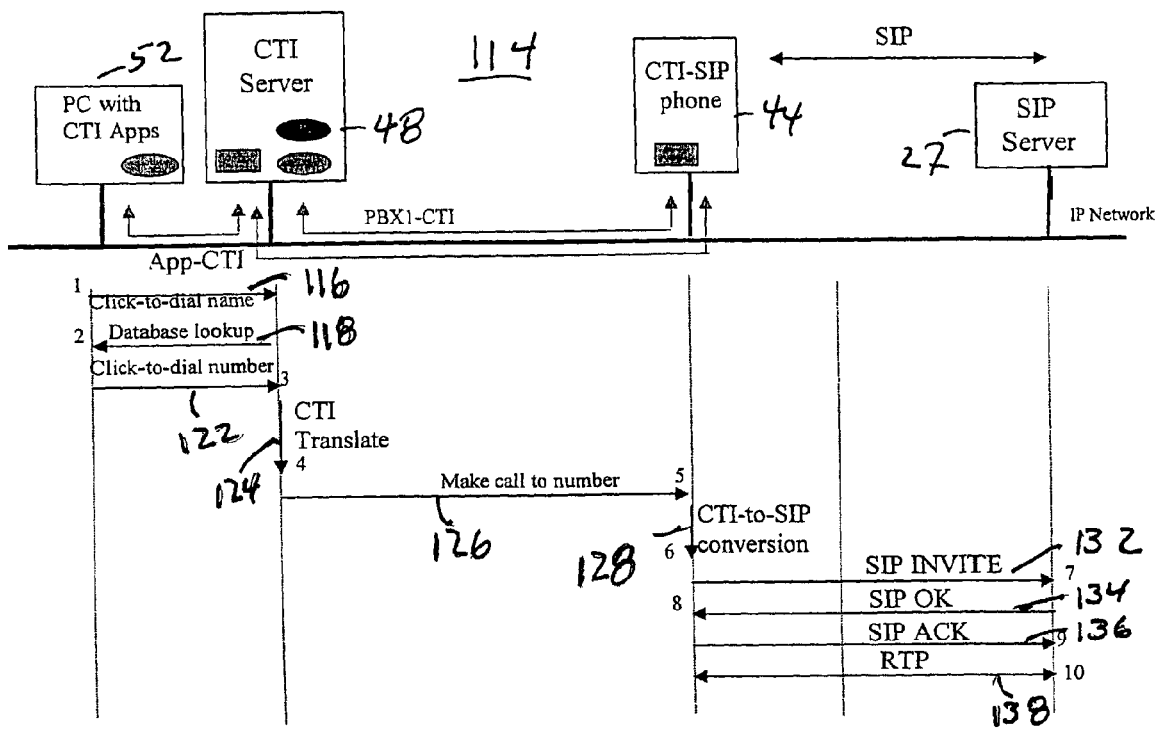
FIG. 3 illustrates a message sequence diagram representative of exemplary outgoing call signaling generated during operation of the telephonic communication network shown in FIG. 1 pursuant to operation of an embodiment of the present invention.

FIG. 3 illustrates a message sequence diagram 114 for an outgoing call, also representative of exemplary operation of the communication network 10, shown in FIG. 1. Again, messages generated and communicated between the SIP server 27, the telephonic station 44, and the CTI device 46, formed of the CTI server 48 and the personal computer 52, are shown. Signaling represented by the diagram 114 is representative of operations pursuant to which a call is originated by the telephonic station 44. Here, a telephonic agent, operating the personal computer 52 enters identification information associated with the party that is to be called. The entry of the information is indicated by the segment 116 and is provided to the CTI server 52. The CTI server invokes a database lookup, indicated by the segment 118, that is delivered to a selected application at the personal computer. The information is retrieved pursuant to operation of the selected application and the numeric identifier of the called party is obtained. The number, a click-to-dial number, is provided, indicated by the segment 122, to the CTI server. And, upon delivery of the number to the CTI server, the CTI server performs CTI translation operations, indicated by the segment 124. And, the translated information is provided, indicated by the segment 126, to the telephonic station. The information forms a make call to number command.

Once delivered to the telephonic station, the apparatus embedded at the telephonic station causes the CTI-formatted numeric information to be converted, indicated by the segment 128, to an SIP format. The make call to number instruction, indicated by the segment 126, forms the indication that causes the initiator 76 (shown in FIG. 1) to cause initiation of operation of the computer telephony integration element, here forming the CTI-to-SIP converter.

Subsequent to the conversion, the telephonic station 44 is caused to generate a SIP invite message, indicated by the segment 132. The invite message is routed to the SIP server 27. And, in response, an SIP OK message, indicated by the segment 134, is returned to the telephonic station. And, the telephonic station generates an SIP acknowledge (SIPACK) message, indicated by the segment 136. RTP data is communicated thereafter, indicated by the segment 138, thereby to effectuate the telephonic communication service.

Figure 4:
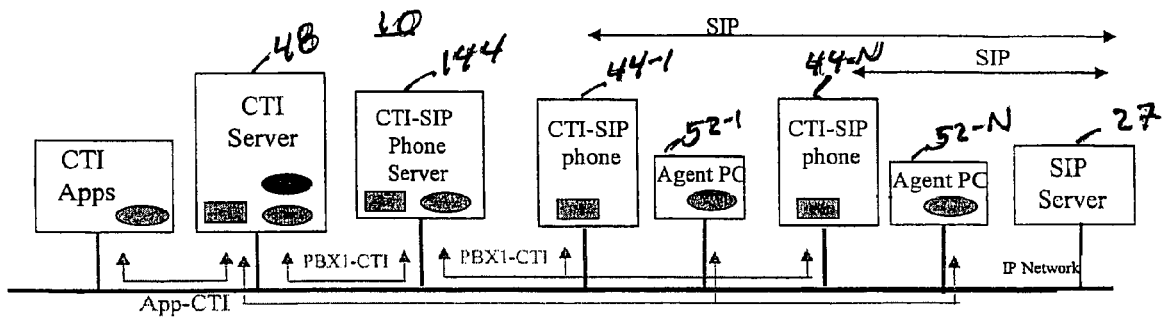
FIG. 4 illustrates a functional block diagram representative of portions of the telephonic communication network of a further embodiment of the present invention.

FIG. 4 illustrates portions of the telephonic communication network 10 forming the call center of a further embodiment of the present invention together with the SIP server 28, also forming part of the telephonic communication network 10. Here, a plurality of telephonic stations, stations 44-1 through 44-n are shown to form part of the call center. A personal computer, such as the personal computer 52, is associated with each of the telephonic stations, user interfaces of which are accessible by telephonic agents that operate the respective telephonic stations. A CTI server 56 and CTI applications 54 are again represented here. Additionally, a CTI-SIP phone server 144 is utilized. Each of the personal computers is coupled to the server 56. The phone server is utilized to provide for fan-out functionality. A single IP connection, indicated by the segment 148 is maintained between the CTI server 48 and the phone server 144. And, the phone server, in turn, provides the fan-out of functionality by maintaining multiple IP connections, here indicated by the segments 152, with the plurality of telephonic stations 44.

Figure 5:
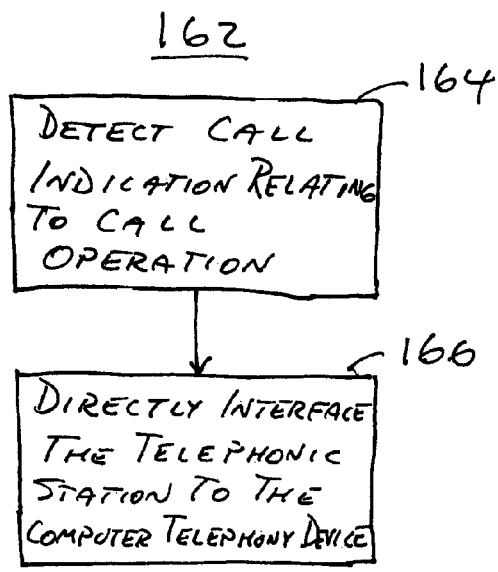
FIG. 5 illustrates a method flow diagram illustrating the method of operation of the method of the embodiment of the present invention.

FIG. 5 illustrates a method flow diagram, shown generally at 162, representative of the method of operation of an embodiment of the present invention. The method 162 facilitates communications by a packet-based telephonic station that is connectable to a packet data network for communication with a remote station. The telephonic station is also connectable to a computer telephony device at which at least a first computer telephony integration application is accessible by the telephonic station.

First, and as indicated by the block 164, detection is made of a call indication relating to a call operation associated with the telephonic station.

And, as indicated by the block 166, responsive to the call indication, the telephonic station is interfaced directly the computer telephony device.

Because of the functionality embedded at the packet-based phone, the need for a PBX, at which the functionality is conventionally provided, is obviated. As the SIP-phone is directly connectable to a public, packet data network, the need for use of a PBX to provide interconnections with a public communication network is also obviated. As the need for a PBX at a telephonic call center is wholly obviated, the expenses associated with installation maintenance of a PBX are correspondingly obviated.

The previous descriptions are of preferred examples for implementing the invention, and the scope of the invention should not necessarily be limited by this description. The scope of the present invention is defined by the following claims.

We claim:

1. A packet based telephonic station operable for peer to peer session initiation protocol (SIP) communications, comprising:
   a computer telephony integration (CTI) sourcing functionality module embedded in the packet based telephonic station operable to convert SIP communications into a CTI format and communicate with a CTI server using CTI protocol;
   an initiator module operable responsive to a peer to peer SIP communication for the telephonic station to initiate operation of said CTI sourcing functionality module;
   wherein the CTI server controls a CTI application on a computer co-located to the packed based telephonic station in response to CTI communications from the packet based telephonic station and wherein the peer to peer SIP communication for the telephonic station is a SIP invite message transmitted to the telephonic station over a packet data network; and wherein the initiator module is operable to initiate operation of the CTI sourcing functionality module responsive to the SIP invite message.

2. The packet based telephonic station of claim 1 wherein the CTI sourcing functionality module is operable responsive to initiation by the initiator module, to transmit a CTI alert message in CTI format to the CTI server, wherein the CTI alert message includes call related information from the SIP invite message.

3. The packet based telephonic station of claim 2, wherein the CTI server controls the CTI application on the co-located computer to retrieve database information associated with the call related information in the CTI alert message and display the database information.

4. The packet based telephonic station of claim 3, wherein the CTI application on the co-located computer includes a customer relationship management application.

5. The packet based telephonic station of claim 1, wherein the CTI server controls a CTI application on a computer co-located to the packet based telephonic station in response to CTI communications from the packet based telephonic station and wherein the initiator module is operable responsive to a CTI call command from the CTI server, to initiate operation of the CTI sourcing functionality module.

6. The packet based telephonic station of claim 1, wherein the CTI server controls a CTI application on a computer co-located to the packet based telephonic station in response to CTI communications from the packet based telephonic station and wherein the CTI sourcing functionality module translates the CTI call command from the CTI server and generates a SIP invite message for transmission to a SIP server over the packet data network.

7. The packet based telephonic station of claim 6, wherein the CTI sourcing functionality module comprises a converter for converting between CTI and SIP formats.

8. A method for peer to peer, session initiation protocol (SIP) communication integrated with computer telephony integration (CTI) applications, comprising:
   receiving a SIP invite message at a telephonic station, wherein the telephonic station is operable for SIP communications;
   initiating operation of a CTI sourcing functionality module embedded in the telephonic station responsive to the SIP invite message, wherein the CTI sourcing functionality module is operable to translate the SIP invite message into a CTI alert message in CTI format, wherein the CTI alert message includes call related information from the SIP invite message; and
   transmitting the CTI alert message by the telephonic station to a CTI server, wherein the CTI server controls a CTI application on a computer co-located with the telephonic station to display database information associated with the call related information in the CTI alert message.

9. The method of claim 8, wherein the CTI application on the co-located computer includes a customer relationship management application.

10. The method of claim 9, further comprising:
    receiving a CTI call command at the telephonic station from the CTI server, wherein the CTI call command is generated in response to a call request from the CTI application on the co-located computer;
    translating the CTI call command by the telephonic station;
    generating a SIP invite message by the telephonic station for transmission to a SIP server over a packet data network.

11. A packet based telephonic station operable for peer to peer session initiation protocol (SIP) communications, comprising:
    a computer telephony integration (CTI) sourcing functionality module embedded in the packet based telephonic station operable to:
    receive a peer to peer SIP communication for the packet based telephonic station from a SIP server;
    convert the SIP communication into a CTI communication having a CTI protocol format that includes call related information from the SIP communication; and
    transmit the CTI communication to a CTI server using CTI protocol, wherein the CTI server controls a CTI application on a computer co-located to the packet based telephonic station in response to the CTI communication from the packet based telephonic station;
    an initiator module operable responsive to the peer to peer SIP communication for the packet based telephonic station to initiate operation of the CTI sourcing functionality module;
    wherein the peer to peer SIP communication for the telephonic station is a SIP invite message transmitted to the telephonic station over a packet data network; and wherein the initiator module is operable to initiate operation of the CTI sourcing functionality module responsive to the SIP invite message.

12. The packet based telephonic station of claim 11 wherein the CTI sourcing functionality module is operable responsive to initiation by the initiator module, to convert the SIP communication into a CTI alert message having a CTI protocol format that includes call related information from the SIP communication and transmit the CTI alert message in CTI format to the CTI server.

13. The packet based telephonic station of claim 12, wherein the CTI server controls the CTI application on the co-located computer to retrieve database information associated with the call related information in the CTI alert message and display the database information on the co-located computer.

* * * * *